No. 668,398. Patented Feb. 19, 1901.
J. ADAIR.
PNEUMATIC TIRE FOR WHEELS.
(Application filed July 17, 1900.)
(No Model.) 3 Sheets—Sheet 1.
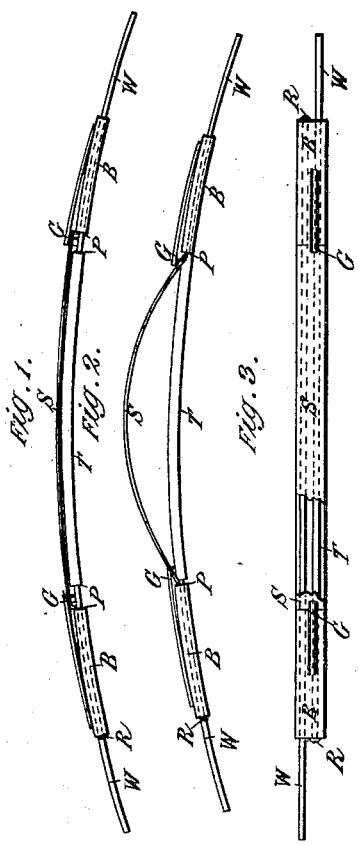

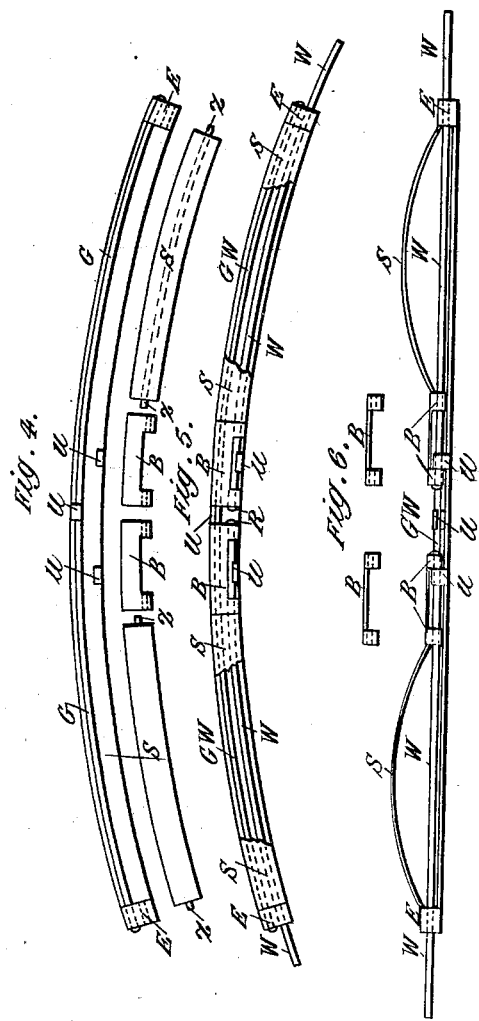

No. 668,398. Patented Feb. 19, 1901.
J. ADAIR.
PNEUMATIC TIRE FOR WHEELS.
(Application filed July 17, 1900.)
(No Model.) 3 Sheets—Sheet 3.
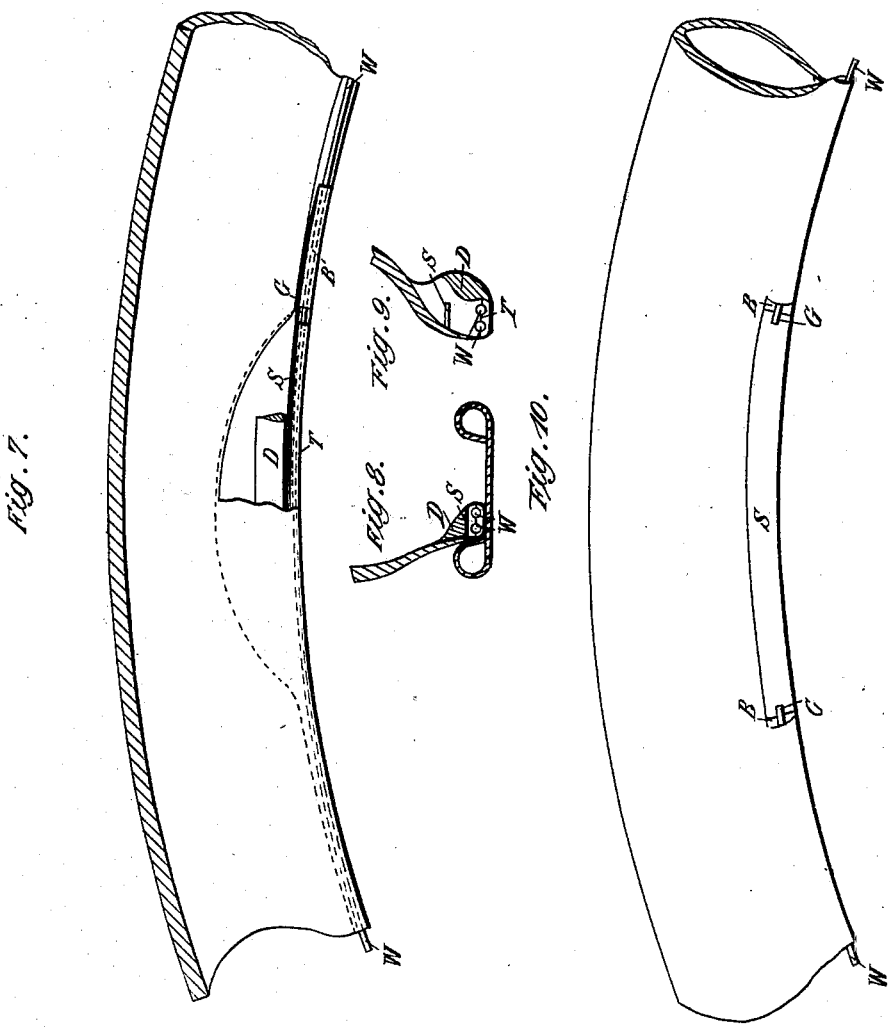

UNITED STATES PATENT OFFICE.

JOHN ADAIR, OF WATERFORD, IRELAND.

PNEUMATIC TIRE FOR WHEELS.

SPECIFICATION forming part of Letters Patent No. 668,398, dated February 19, 1901.

Application filed July 17, 1900. Serial No. 23,965. (No model.)

*To all whom it may concern:*

Be it known that I, JOHN ADAIR, baker, a subject of the Queen of Great Britain, residing at Waterford, Ireland, have invented certain new and useful Improvements Relating to Pneumatic Tires for Wheels and Arrangements in Connection with Such Wheels, of which the following is a specification.

The object of this invention is to facilitate the fitting of pneumatic tires to and the removal of the same from wheel-rims.

To illustrate the important features of this invention, I refer to my United States of America Patent No. 646,935, in which a spring device is described as a means by which an elastic coil is constructed for the purposes specified.

This invention is an improvement in such spring device, altering the construction of same from wire bent after the form therein described to flat steel springs resting between blocks, through which the coil-wires encircling the edges of the tire pass. The advantage of this arrangement is that the springs are kept in a true position to correctly operate for the purposes required.

A further important feature in this invention is that the springs being made of flat steel-plate instead of wire present a greater surface to receive the inflation-pressure of the air-tube and are thereby prevented arching, while in the United States of America patent already referred to the wire not having such surface requires the assistance of other means therein stated, and which in this invention are to a large extent dispensed with. Further, double springs can be used, and thus the elasticity of the coil increased, and, further, the coil-wires encircling the edges of the tire being connected to the springs in such a manner as to not overlap thereby to some extent diminish friction, and thus allow the springs to move evenly and to readily act.

A further important feature in this invention is the method by which I control the arching of the springs—viz., by the stop action which is illustrated in the drawings. This is a great improvement on the method described and illustrated in my prior patent, No. 646,935—viz., the stitching of the canvas pocket edge of tire in the formation of an incasement to control the arching of the spring.

A further improvement is the method by which the coil is constructed—viz., by passing the ends of the wire through blocks and enlarging the wire heads, so that they cannot escape therefrom, or, if preferred, nuts might receive the ends of the wire, such nuts being formed to allow the ends of the wire to be riveted into same. For the purpose of preventing the air-tube from coming in contact with such spring a canvas flap may cover same. Thus my improvements give an elarged scope to the using of arching springs in pneumatic tires as a means of making an elastic coil.

In order that my invention may be clearly understood and readily carried into effect, I will proceed to describe the same more fully, with reference to the accompanying drawings, in which—

Figures 1, 2, and 3 show the spring resting between blocks through which the coil-wires pass, Figs. 1 and 2 being side views, and Fig. 3 a top view. Figs. 4, 5, and 6 show the springs resting between blocks in a framework through which the coil-wire passes, Figs. 4 and 5 being side views, and Fig. 6 a top view. Figs. 7, 8, and 9 represent the springs resting between the aforesaid blocks in pocket edge of cover and bead in such pocket, for the purpose hereinafter described. Fig. 10 shows the spring resting between the aforesaid blocks and located outside pocket edge of tire.

Referring to Figs. 1, 2, and 3, S is the spring. B represents the blocks; W, the wires which pass through same. G are the grasps or catches, which hook into holes in the spring. Each block B is fixed on one end of the wire W and is capable of sliding upon and thus being guided by the other end of the said wire. Fig. 1 shows the position of the spring when the tire is in place on the rim of the wheel. Fig. 2 represents the spring arched for detachment of the tire. Fig. 3 is a plan of Fig. 1. This view more clearly shows the wires W of the coil passing through the blocks B and their terminations held in the blocks by the riveted ends R. This view also clearly shows the grasps or catches G entering into the spring S by means of holes in same. These grasps may be formed on the blocks B by a wire, as shown, brazed on same, or may be constructed in any other convenient manner. It will be particularly noted that the springs butt against the blocks B, and consequently these grasps are only to hold the spring into its required position. Further, referring to Fig. 1, it will be noticed that the incasing tube T on the coil-wires W controls the action of the spring. These tubes are connected together and form a sort of framework for the wires to run in, being filed flat on the top to give a convenient seat for spring to rest on. Of course it is obvious that they need not necessarily be tubes, but can be formed out of one piece rolled into the desired shape. The spaces P indicate the freedom for spring to arch, as in Fig. 2, in which it will be noticed that the spaces disappear.

Fig. 7 represents the spring incased in the pocket edge of tire. The portion exhibited by the break in such edge represents a bead D, resting on spring. Fig. 8 further illustrates this bead, being a part cross-section of tire when inflated, the pressure of the air-tube on the bead forcing it on the spring, and thereby preventing the spring arching. It will be understood that this bead is attached to the pocket edge of tire, as represented in Fig. 9, the spring in this case being arched and the air-tube being deflated. It will be noted in Fig. 7 the manner in which the pocket edge is stitched to allow for the arching of the spring; but, further, the blocks are stitched into a position in the pockets, so that they may be held in their required places.

Fig. 10 illustrates the spring outside the pocket edge of tire, the grasps G and the end of the block B projecting through the pocket edges of cover in order to receive the spring. It will be noticed that the spring in this case is altered in its position, so that it works with its edge downward toward the rim.

Fig. 4 represents the frame of the framework in which the spring is located, the projections E being formed on ends of a plate and the stops U being also formed on same, a guiding-wire G W extending the length of the frame and fastened securely in the projections E and held in its position by one of the stops U. The purpose of this wire is to guide the blocks B, which run into same. B B show blocks detached from the wires, and S S springs with teeth Z at their terminations, which will be further referred to.

Fig. 5 represents the frame with the coil-wires W secured to the blocks B by their terminations being riveted at R. It will be noticed these blocks slide on the guide-wire G W, holes being in them for the purpose of allowing this wire to pass through and also for the coil-wires W to enter. For the purpose of clearer illustration the springs S are shown broken. It will be noticed that the stops U at the bottom of the frame are seated in apertures in the blocks B, thereby controlling the movement of the blocks, and consequently the action of the springs which are connected to same. Further, the teeth Z on the springs enter into seats for same in the blocks B and in the projections E on frame and by such means are held into their position.

Fig. 6 illustrates a top view of frame with the springs arched. It will be noted that the stops U here have controlled the movement of the springs and that the pressure of the springs is on the projections E of the frame and the ends of the blocks B. The blocks are shown detached above this view, the coil-wires passing through the legs of same.

It will be readily observed that when the spring, as represented by Fig. 5, is in the pocket edge of tire the pressure of the air-tube operating upon the springs will be amply sufficient to prevent their arching, inasmuch as in this case the springs are straight.

It will be noticed that the coil is formed perfectly, as the termination of the wires are secured into the blocks.

The advantages of these methods are not only the improvement of the elastic coil, but also allowing a rim with a flat base to be used, as represented in Fig. 8.

Of course it is obvious that the device as shown in Fig. 5 can be placed in the pocket edge of the cover with the springs facing toward the edge of rim, in which case the air-tube forcing the springs against the edge of rim elastically holds them there. The cover is stitched, so as to prevent the device from shifting in the pocket edge, and a freedom is given for the springs to arch by stitching the pocket, as represented in Fig. 7.

Though in my prior patent, No. 646,935, I claim an arching spring inside the pocket edge of a pneumatic tire, it is obvious that by the improvements herein described I can use an arching spring outside the pocket edge of the tire in the following manner, viz: The blocks through which the coil-wires pass may be seated inside the pocket edge of the tire and may have projections which pass through the tire-cover to the outside of the pocket edge and there receive the spring, as shown in Fig. 10, or the ends of the frame E and the sliding blocks shown in Figs. 4, 5, and 6 may be provided with projections adapted to pass through the cover of the tire, the springs being placed between said projections outside the tire-cover. Hence my improvements may be employed with arching springs irrespectively of the position with respect to the tire-cover in which such springs may be placed.

What I claim, and desire to secure by Letters Patent of the United States, is—

1. The combination with a wheel-rim and a pneumatic tire, of coil-wires having free ends in the pocket edges of the tire, sliding blocks carried by the free ends of the coil-wires, arching springs which tend to move the blocks so as to tighten the coil-wires on the wheel-rim, and stops for limiting the movement of the said blocks, substantially as described.

2. The combination with a wheel-rim and a pneumatic tire, of coil-wires having free ends in the pocket edges of the tire, sliding blocks carried by the free ends of the coil-wires, arching springs which tend to move the said blocks so as to tighten the coil-wires on the wheel-rim, means for guiding the said blocks, and stops for limiting the movement of the said blocks, substantially as described.

3. The combination with a wheel-rim and a pneumatic tire, of coil-wires having free ends in the pocket edges of the tire, sliding blocks carried by the free ends of the coil-wires, arching springs which tend to move the said blocks so as to tighten the coil-wires on the wheel-rim and which are located inside the pocket edge of the tire, means for guiding the said blocks, and stops for limiting the movement of the blocks, substantially as described.

4. The combination with a wheel-rim and a pneumatic tire, of coil-wires having free ends in the pocket edges of the tire, sliding blocks carried by the free ends of the coil-wires, arching springs whose ends bear on the sliding blocks and which tend to move the said blocks so as to tighten the coil-wires on the wheel-rim, means for holding the ends of the said springs in contact with the said blocks, means for guiding said blocks and stops for limiting the movement of said blocks, substantially as described.

5. The combination with a wheel-rim and a pneumatic tire, of coil-wires having free ends in the pocket edges of the tire, sliding blocks carried by the free ends of the coil-wires, arching springs which tend to move the said blocks so as to tighten the coil-wires on the wheel-rim, and beads located inside the pocket edges of the tire to prevent the said springs from arching when the tire is inflated, substantially as described.

6. The combination with a wheel-rim and a pneumatic tire, of coil-wires having free ends in the pocket edges of the tire, sliding blocks carried by the free ends of the coil-wires, arching springs whose ends bear on the sliding blocks and which tend to move the said blocks so as to tighten the coil-wires on the wheel-rim, means for holding the said springs in contact with the said blocks, beads located inside the pocket edges of the tire to prevent the springs from arching when the tire is inflated, means for guiding said blocks and stops for limiting the movement of said blocks, substantially as described.

In testimony whereof I have hereunto set my hand, in presence of two subscribing witnesses, this 29th day of June, 1900.

JOHN ADAIR.

Witnesses:
J. J. MOLONEY,
WIL. G. HOUSON.